United States Patent Office 3,563,973
Patented Feb. 16, 1971

3,563,973
ARTICLES WITH POLYMERIC MEMORY AND
METHOD OF CONSTRUCTING SAME
Sol J. Arditti, Plainview, N.Y., Souren Z. Avedikian,
Short Hills, N.J., and Bruce S. Bernstein, Forest Hills,
N.Y., assignors to Radiation Applications Incorporated,
Long Island City, N.Y., a corporation of New York
No Drawing. Filed Mar. 4, 1965, Ser. No. 437,280
Int. Cl. C08f 3/04
U.S. Cl. 260—94.9
16 Claims

ABSTRACT OF THE DISCLOSURE

This disclosure relates to a novel process for forming polymeric structures, for example, for making toy figurines. In the process of this invention a polymeric structure comprising polymers or copolymers of ethylene or propylene are molded to a first desired shape; the structures are then irradiated to cross-link the polymer; said structure is then heated to reduce its crystallinity, whereupon it is readily collapsed and cooled to reduce its size several-fold. Subsequently the polymeric structure can be heated to substantially develop its original shape.

---

This invention relates to a novel structure for a package, bottle, toy and other articles of commerce made of molded or otherwise fabricated polymeric materials wherein these objects have two characteristics in common, namely: (1) their shape at the time they reach the user, and (2) their capability to regain, or to return to, their original individual shape, configuration and size upon specified, special treatment by the user.

The structures, on shipment can all be virtually two dimensional, having length and breadth but very little thickness. The thickness of the flat pieces can be approximately the sum of the wall thickness of the bottle, hollow toy, hollow package, or the erectable housing or tent (which may be disposable, or recoverable for continuing use), or the shipping thickness can be some fraction of the initial thickness of the object if said object is not a hollow molded structure. The structure prepared for shipment can be any odd shape, or it can be some well-defined geometric shape, as a cube, sphere or cylinder.

The structures for shipment possess the property of regaining, or returning to its original, individual and unique size and shape. This original shape may be a toy, bottle, package, figurine, molecular structure configuration (for example for use in lecture demonstration in a chemistry or physics class), tent or housing. When the object is heated to the proper, required temperature, the original size and shape are attained.

The property of the polymeric material which makes possible the above is the polymeric memory which we have built previously into the polymer.

Polymeric memory can be built into a polymer (which polymer preferably is crystalline in nature) by crosslinking said polymer by the use of irradiation or through chemical means. Specifically for one polymer, polyethylene, crosslinking is accomplished as follows. The polyethylene object, molded by any conventional means, is exposed to a radiation source. This radiation source may be a radioisotope, such as cobalt-60 or cesium-137 which are gamma-emitters. The radiation source may also be reactor waste products, reactor radiation or high energy electron accelerators. In our work, we have used cobalt-60 and high energy electron accelerators successfully to crosslink polyethylene.

The crosslinking of polyethylene by chemical means is, however, quite another matter. In chemical crosslinking, a catalyst is used and the crosslinking (or "curing") is actually accomplished by heating the polyethylene-catalyst system to the "curing" temperature. Cumene hydroperoxide and dicumyl peroxide are among the catalysts suitable for this purpose. The "curing" or crosslinking takes place during the molding operation. Depending upon the catalyst-polyethylene system used (nature of the peroxide, or other catalyst, and whether high or low density polyethylene or higher or lower molecular weight polyethylene is involved), the "curing" or crosslinking of the polyethylene is completed in 30 seconds to 10 minutes. Three minutes is typical.

The crosslinking process has been known for a long time and for many different polymers. Its effect is generally to improve many of the properties of the polymer. It imparts greater toughness, solvent and heat resistance to the polymer; it increases its strength and makes it infusible. There has been considerable progress since the earliest report of improvement in the properties of polyethylene in 1955 when General Electric Company published its work involving irradiation of polyethylene. Exposure of polyethylene to gamma radiation or to high energy electrons, it is theorized, causes cleavage of carbon to hydrogen bonds largely and to a small degree of carbon to carbon bonds. This results in the formation of radicals and of gaseous hydrogen; and crosslinking of the polymer chains by a recombination of the formed radicals. Polymers that are thus crosslinked hold their shape above their crystalline melting points. This technique has also made possible and shown the way to the production of ladder polymers. Solubility of polyethylene in hot xylene can be reduced from 100% for ordinary polyethylene to less than 10–15% for crosslinked polyethylene. As a matter of fact depending on the extent of crosslinking, the solubility can be as low as 5–10% and infusibility so increased that it no longer has a definable melting point. As the temperature is raised, to that of the oxyacetylene torch, the crosslinked polyethylene burns with ablation.

It is apparent, that there have been, to date, two lines of development in the art of crosslinking and in the art of utilizing the effects of crosslinking.

The first, for example, in the case of polyethylene, was to change its properties to withstand certain physical environments, e.g., higher temperatures than normal, which polyethylene that had not been crosslinked could not withstand.

The second resulted from an appreciation of the "memory" which crosslinked polyethylene appeared to exhibit. This led to the development and utilization of crosslinked polyethylene tubing which was stretched and expanded after crosslinking by the application of force at the proper elevated temperature and then cooled in the expanded and stretched state to retain the new dimensions. This tubing subsequently used as a sheath would shrink to its original diameter and length when heated to the proper temperature. This would give a tight fit or bond. A similar application is stretched polyethylene film, or its equivalent, after irradiation-heating-stretching and cooling in the stretched state, which gives a heat-shrinking, tight package making material.

Our invention involves a third line of development employing cross linked polymers such as polyethylene. This third line of development is distinct from the direction of the art as practiced hitherto. The cross linked memory effect has been used hitherto to permit stretching a film or surface that will then shrink back to its original shape. Our invention, by contrast, does not involve the stretching or expansion of the volume encompassed by a cross linked polyethylene product but rather involves the collapsing (as by folding or pressing) of the original shape of the product in order to decrease the volume encompassed by the structure. Thus, we employ a memory effect in order to expand a collapsed shape back to its original (and expanded) shape and size.

This original shape and size will be referred to herein as the "normal" size and shape of the structure or, for clarity, as the "normal expanded" size and shape of the structure.

To practice our invention, it is necessary to have the molded object of polyethylene, whatever said object might be, crosslinked. The crosslinking is accomplished at time of molding as in the case of chemically induced crosslinking or subsequent to molding if crosslinking is achieved by irradiation. The radiation dose required depends on the polyethylene molecular weight. For high density polyethylene, a radiation dose of 10 to 60 megarads has been found to achieve the degree of crosslinking necessary to impart polymeric memory. The higher the dose, the greater the degree of crosslink obtained. As low a degree of crosslinking as indicated by xylene solubility of 40% shows some polymeric memory effect. The lower the xylene solubility, however, the more effective is the regaining of the original shape and size of the object. The crosslinked polyethylene object, for example, one made of high density material, is then heated to a temperature of about 140° C., and, while at that temperature, it is collapsed or folded into a desired shape. After collapsing, the object is cooled to retain the collapsed shape and size. The collapsing operation is carried out as rapidly as is convenient (thirty minutes is satisfactory). Substantial delay (such as overnight), will cause some loss of the polymeric memory. In the case of low density polyethylene, the temperature required for collapsing is below 140° C. It may be as low as 110° C. In the case of copolymers of ethylene, with for example vinyl acetate and ethyl acrylate, the temperature at which the object is collapsed is lower than 100° C. The cooling is accomplished by quenching the object in cold water or in cold air. Exposure of the object to the elevated temperature under a force, such as used for the collapsing operation, for an excessively long period of time will cause loss of the polymeric memory. It is, therefore, necessary to carry out these operations rapidly.

The object which has thus been collapsed can be retained in the collapsed state for long periods of time at normal temperature and pressure. The object will expand to its original shape and size when it is heated to the temperature at which it had been collapsed or folded. During the period of its return to its original shape and size, care must be taken to avoid imposition of an external force on the object as this, too, would cause some loss of the polymeric memory. The object when properly expanded to its original shape and size retains the full details of its original structure. All details, even fine ridges, are clearly discernible.

Any device which is capable of heating the object can be used to cause the object to regain its original shape and size. For toys and small objects, figurines and the like, the kitchen oven can be used satisfactorily when set thermostatically at about 275°–300° F. (135° C.–149° C.). The larger, erectable housing or tent can be made to regain its original intended structure by heating it in sections with hot air from a suitable hot air blower, or the exhaust of the automobile to which a suitable connecting tube has been attached. Care must be exercised in the latter case to avoid carbon monoxide poisoning. We have found that a small oven or incubator heated by means of one or two electric light bulbs functions quite satisfactorily to cause the smaller collapsed structures to expand to their original shape and size.

Although the novel structures of this disclosure have been discussed in detail in relation to polyethylene, the same results are obtained with any polymer which is capable of being treated in a manner similar to polyethylene to impart a plastic memory to the polymer. For example, copolymers of ethylene with vinyl acetate, ethyl acrylate, butene, and semi-crystalline copolymers with propylene are all possible polymers out of which the structures of this invention would be made.

What is claimed is:

1. The method of preparing a polymeric structure for shipment comprising the steps of:
    molding said structure from an appropriate polymer, selected from the group consisting of crystalline or semi-crystalline polymers of ethylene and propylene,
    radiating said molded structure to cross-link the molecules of said polymer, said radiating being at a dose of about 10 to 60 megarads,
    heating said radiated structure to a temperature where it can be readily deformed without losing its memory effect,
    rapidly collapsing said heated structure to a desired package size and shape, and
    quickly cooling said collapsed structure, whereby said collapsed structure on being heated will substantially develop the normal size and shape of said molded structure.

2. The method of claim 1 wherein said polymer is a copolymer of ethylene with a member selected from the group consisting of vinyl acetate, ethyl acrylate and butene.

3. The process of claim 1 wherein said polymer is high density polyethylene and said heating comprises bringing said polymer to a temperature of about 140° C.

4. The process of claim 1 wherein said polymer is low density polyethylene and said heating comprises bringing said polymer to a temperature of from about 110° C. up to 140° C.

5. The process of claim 2 wherein said heating includes temperatures up to about 100° C.

6. The method of producing a toy of a predefined shape which comprises molding a polymeric substance selected from the group consisting of crystalline or semi-crystalline polymers of ethylene and propylene to form said polymeric structure of said predefined shape, subjecting said polymeric structure to irradiation of a sufficient dosage to provide said polymer with a cross-linked polymeric memory, heating said polymeric structure to a first temperature to provide a deformable structure, subjecting said polymeric structure to sufficient pressure to reduce it several-fold below said predefined shape and rapidly cooling said reduced polymeric structure, whereby the reduced polymeric structure may subsequently be expanded by the application of heat to form said predefined shape.

7. The method of claim 6 which comprises heating said reduced polymeric structure to a temperature which reduces its degree of crystallinity whereupon it regains its original predefined shape.

8. The method of claim 11 wherein said polymeric substance is a copolymer of ethylene with a member selected from the group consisting of vinyl acetate, ethyl acrylate and butene.

9. The method of claim 12 wherein said polymeric substance is a copolymer of ethylene with a member selected from the group consisting of vinyl acetate, ethyl acrylate and butene.

10. The method of claim 11 wherein said heating comprises exposing the reduced polymeric structure to the heat of at least one electric light bulb.

11. The method of making a toy which comprises:
    molding a polymeric substance selected form the group consisting of crystalline or semi-crystalline polymers of ethylene and propylene to form a polymeric structure of a predefined shape;
    irradiating said polymeric structure with a dosage of about 10 to 60 megarads to provide said polymeric structure with a cross-linked polymeric memory;
    heating said polymeric structure to a first temperature to provide a deformable structure;
    aplying pressure to said polymeric structure to form a reduced polymeric structure of substantially lesser size than said predefined shape, and;

rapidly cooling said reduced polymeric structure; whereby the reduced polymeric structure may subsequently be expanded by the application of heat to form said predefined shape.

12. The method of claim 11 which comprises heating the reduced polymeric structure to approximately said first temperature whereby said reduced polymeric structure regains said predefined shape.

13. A polymeric structure for shipment made by the process of claim 1.

14. A toy made by the process of claim 6.

15. A toy made by the process of claim 11.

16. The method of claim 6 wherein said polymeric substance is a copolymer of ethylene with a member selected from the group consisting of vinyl acetate, ethyl acrylate and butene.

References Cited

UNITED STATES PATENTS 3,079,370   2/1963   Precopio _____ 260—94.9

JOSEPH L. SCHOFER, Primary Examiner

R. A. GAITHER, Assistant Examiner

U.S. Cl. X.R.

46—115, 15.3, 153; 204—159, 159.2; 260—80.3, 86.7, 87.3, 88.2, 93.7